(12) United States Patent
Hassan et al.

(10) Patent No.: US 8,440,818 B2
(45) Date of Patent: *May 14, 2013

(54) SYSTEM AND METHOD FOR GAS REACTION

(75) Inventors: Abbass Hassan, Sugar Land, TX (US); Rayford G. Anthony, College Station, TX (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,780

(22) Filed: Apr. 13, 2012

(65) Prior Publication Data

US 2012/0202986 A1  Aug. 9, 2012

Related U.S. Application Data

(63) Continuation of application No. 12/706,468, filed on Feb. 16, 2010, now Pat. No. 8,178,053.

(60) Provisional application No. 61/154,197, filed on Feb. 20, 2009.

(51) Int. Cl.
| | |
|---|---|
| *C07H 1/00* | (2006.01) |
| *C07H 3/00* | (2006.01) |
| *C08B 37/00* | (2006.01) |
| *B01J 19/00* | (2006.01) |
| *B01J 10/00* | (2006.01) |
| *B01J 8/00* | (2006.01) |
| *B01J 8/02* | (2006.01) |
| *B01J 8/04* | (2006.01) |
| *B01J 8/08* | (2006.01) |
| *B01J 35/02* | (2006.01) |

(52) U.S. Cl.
USPC ........... 536/124; 422/129; 422/187; 422/209; 422/211; 422/600; 422/630

(58) Field of Classification Search .................. 422/129, 422/187, 209, 211, 600, 630; 585/639; 536/124; 562/519; 568/902.2

See application file for complete search history.

(56) References Cited

U.S. PATENT DOCUMENTS

| | | |
|---|---|---|
| 3,887,167 A | 6/1975 | Irwin |
| 3,996,012 A | 12/1976 | Zucker |

(Continued)

FOREIGN PATENT DOCUMENTS

| | | | |
|---|---|---|---|
| JP | 2004142959 A | 5/2004 | |
| JP | 2005319452 A | 11/2005 | |

(Continued)

OTHER PUBLICATIONS

Machine translation of JP 2004-142959 A, published May 20, 2004 (20 pgs.).

(Continued)

*Primary Examiner* — Jill Warden
*Assistant Examiner* — Natasha Young
(74) *Attorney, Agent, or Firm* — Porter Hedges LLP; Timothy S. Westby

(57) ABSTRACT

Herein disclosed is an apparatus having a first porous rotor positioned about an axis of rotation, wherein the first porous rotor comprises a first catalyst; an outer casing, wherein the outer casing and the first porous rotor are separated by an annular space; and a motor configured for rotating the first porous rotor about the axis of rotation.

18 Claims, 5 Drawing Sheets

U.S. PATENT DOCUMENTS

| | | | |
|---|---|---|---|
| 5,538,191 | A | 7/1996 | Holl |
| 5,877,350 | A | 3/1999 | Langer et al. |
| 6,193,504 | B1 | 2/2001 | Chen et al. |
| 6,368,366 | B1 | 4/2002 | Langer et al. |
| 6,368,367 | B1 | 4/2002 | Langer et al. |
| 6,383,237 | B1 | 5/2002 | Langer et al. |
| 6,530,964 | B2 | 3/2003 | Langer et al. |
| 6,742,774 | B2 | 6/2004 | Holl |
| 8,178,053 | B2 * | 5/2012 | Hassan et al. ............ 422/211 |
| 8,277,540 | B2 | 10/2012 | Hassan et al. |
| 2003/0010013 | A1 | 1/2003 | Johnstone |
| 2003/0043690 | A1 | 3/2003 | Holl |
| 2004/0052158 | A1 | 3/2004 | Holl |
| 2005/0033069 | A1 | 2/2005 | Holl et al. |
| 2006/0245991 | A1 | 11/2006 | Holl et al. |
| 2010/0313751 | A1 | 12/2010 | Hassan et al. |

FOREIGN PATENT DOCUMENTS

| | | |
|---|---|---|
| JP | 2012518528 | 8/2012 |
| WO | 2002064708 A2 | 8/2002 |

OTHER PUBLICATIONS

Machine translation of JP 2005-319452 A, published Nov. 17, 2003 (39 pgs.).

International Search Report and Written Opinion dated Sep. 28, 2010 for corresponding International Patent Application No. PCT/US2010/024361 (8 pgs.).

IKA-Rotor-Stator Generators—2003 Processing Ctalog (38 pgs.).

Gogate, et al. "Cavitation: A technology on the horizon," Current Science 91, No. 1, Jul. 2006, pp. 35-46 (12 pgs.).

Office Action dated Jun. 25, 2009 for U.S. Appl. No. 12/142,447 (10 pgs.).

Office Action dated Jan. 7, 2010 for U.S. Appl. No. 12/142,447 (6 pgs.).

Office Action dated May 13, 2010 for U.S. Appl. No. 12/142,447 (5 pgs.).

Office Action dated Feb. 4, 2010 for U.S. Appl. No. 12/492,721 (5 pgs.).

Office Action dated Feb. 18, 2010 for U.S. Appl. No. 12/635,433 (6 pgs.).

Office Action dated Feb. 18, 2010 for U.S. Appl. No. 12/635,454 (6 pgs.).

Office Action dated May 14, 2010 for U.S. Appl. No. 12/137,441 (15 pgs.).

Office Action dated Feb. 19, 2010 for U.S. Appl. No. 12/144,459 (10 pgs.).

Office Action dated Sep. 2, 2009 for U.S. Appl. No. 12/142,433 (11 pgs.).

Office Action dated Jan. 29, 2010 for U.S. Appl. No. 12/142,433 (8 pgs.).

Office Action dated May 24, 2011 for U.S. Appl. No. 12/142,433 (10 pgs.).

Office Action dated Apr. 30, 2010 for U.S. Appl. No. 12/141,191 (12 pgs.).

Office Action dated Oct. 27, 2009 for U.S. Appl. No. 12/142,120 (15pgs.).

Office Action dated May 5, 2010 for U.S. Appl. No. 12/571,537 (12 pgs.).

Office Action dated Feb. 24, 2011 for U.S. Appl. No. 12/796,358 (13 pgs.).

Office Action dated Feb. 29, 2012 for U.S. Appl. No. 12/146,733 (8 pgs.).

Office Action dated Jun. 3, 2011 for U.S. Appl. No. 12/568,155 (11 pgs.).

Office Action dated Jun. 2, 2011 for U.S. Appl. No. 12/427,286 (12 pgs.).

Office Action dated Jun. 3, 2011 for U.S. Appl. No. 12/568,280 (16 pgs.).

Notice of Publication for corresponding Chinese Application No. 201080017185.7 dated May 4, 2012 (23 pgs.).

* cited by examiner

# US 8,440,818 B2

SYSTEM AND METHOD FOR GAS REACTION

CROSS-REFERENCE TO RELATED APPLICATIONS

This application is a continuation application of U.S. Ser. No. 12/706,468 filed on Feb. 16, 2010, which application claims the benefit under 35 U.S.C. §119(e) of U.S. Provisional Patent Application Ser. No. 61/154,197 filed Feb. 20, 2009, said applications being incorporated herein by reference in their entirety for all purposes.

STATEMENT REGARDING FEDERALLY SPONSORED RESEARCH OR DEVELOPMENT

Not applicable.

BACKGROUND OF THE INVENTION

1. Technical Field

The present invention generally relates to production of desired product via reaction of gases. More specifically, the present invention relates to reaction of gases via centrifugation. Even more specifically, the present invention relates to enhanced reaction of gases via catalytic centrifugation.

2. Background of the Invention

The rate and extent of chemical reactions are limited by the laws of kinetics and thermodynamics. The rate of reaction is dependent on many things, including time, temperature, and pressure. In the case of catalyzed reactions there is the additional rate limiting factor of the contact time of the reactants with the catalyst and the time for reacted products to be removed from the surface of the catalyst to enable the catalyst to catalyze further reactants.

In conventional reactors, contact time for the reactants and catalyst is often controlled by mixing which provides contact between components involved in a chemical reaction. There have been various innovations directed towards maximizing the use of mixing and mixing devices to accelerate chemical reactions. High shear and high energy mixing devices have been proposed for enhancing the rate of chemical reactions.

There have been other devices proposed for accelerating the reactions of chemical reactants. For example, there has been prior disclosure on methods of accelerating chemical reactions through the use of hydrodynamic cavitation. Hydrodynamic cavitation involves phase change and rapid increases in temperatures and pressures; pressure variation caused by the variation in the flowing liquid velocity results in accelerated chemical reaction.

There is a need in the art for efficient and economical apparatus and methods of reacting gaseous components to produce a desired product. Desirably, the conversion of energy to reaction is maximized via the disclosed system and method.

SUMMARY

Herein disclosed is an apparatus, which comprises (1) a first cylindrical, porous, catalytic rotor symmetrically positioned about an axis of rotation and surrounding a first interior space; wherein the first porous catalytic rotor comprises a first catalyst; (2) an outer casing, wherein the outer casing and the rotor are separated by an annular space; (3) a motor configured for rotating the rotor about the axis of rotation; (4) a feed inlet line; and (5) a first outlet line, wherein the first outlet line is fluidly connected with the annular space. In embodiments, the feed inlet line of the apparatus is fluidly connected with the first interior space. In some embodiments, the feed inlet line extends into the first interior space. In some cases, the feed inlet line extends into a vertically central portion of the first interior space. In some other cases, the feed inlet line extends to a position within the first interior space proximal the axis of rotation.

In embodiments, the rotor of the apparatus is substantially tubular. In embodiments, the first porous catalytic rotor of the apparatus is made from or comprises a selectively permeable material. In some cases, the selectively-permeable material is made with, impregnated or coated with a catalyst. In some other cases, the selectively-permeable material comprises sintered metal or ceramic. In embodiments, the first porous, catalytic rotor has a diameter in the range of from about 4 to about 12 inches. In embodiments, the first porous, catalytic rotor has a length in the range of from about 8 to about 20 inches. In embodiments, the motor of the apparatus is capable of providing a rotational frequency of the rotor of up to at least 7,500 RPM.

In certain embodiments, the apparatus further comprises a second porous catalytic rotor concentric with the first porous catalytic rotor and surrounding a second interior space, wherein the second porous catalytic rotor comprises a second catalyst. In embodiments, the feed inlet line is fluidly connected with the first interior space. In some certain embodiments, the apparatus further comprises a second outlet, wherein the second outlet line is fluidly connected with the second interior space. In certain embodiments, the first catalyst and the second catalyst of the apparatus are the same. In certain other embodiments, the first catalyst and the second catalyst of the apparatus are different. Another aspect of the disclosure includes a system that comprises a plurality of the apparatus as described. In some embodiments, the porous, catalytic rotor of a first apparatus of the system has a different catalytic functionality than the porous, catalytic rotor of a second apparatus.

Herein disclosed is also a method of producing a product of a gaseous reaction. The method comprises (1) passing a feed gas comprising at least one gaseous reactant through a porous, catalytic rotor from an inlet side of the rotor, wherein the porous, catalytic rotor is permeable to the at least one gaseous reactant and is made from or contains a catalyst effective for catalyzing a first reaction; and (2) extracting a first desired product from the outlet side of the rotor. In embodiments, the method further comprises rotating the porous, catalytic rotor about an axis of rotation at a rotational frequency. In embodiments, the rotor is cylindrical. In certain embodiments, the porous, catalytic rotor comprises sintered metal or ceramic. In embodiments, the sintered metal or ceramic is made with, impregnated by or coated with catalyst.

In certain embodiments, the disclosed method further comprises passing the desired product through a second porous, catalytic rotor from an inlet side of the second porous, catalytic rotor, wherein the second porous, catalytic rotor is permeable to the first desired product and is made from or contains a catalyst effective for catalyzing a second desired reaction. In some cases, the first porous, catalytic rotor and the second porous, catalytic rotor are comprised in a single apparatus. In some other cases, the first porous, catalytic rotor and the second porous, catalytic rotor are contained in two separate apparatus.

Embodiments disclosed herein may pertain to an apparatus having a first porous rotor positioned about an axis of rotation, wherein the first porous rotor comprises a first catalyst; an outer casing, wherein the outer casing and the first porous rotor are separated by an annular space; and a motor configured for rotating the first porous rotor about the axis of rotation. The apparatus may also include a feed inlet line; and a first outlet line.

In some aspects, the first outlet line is in fluid communication with the annular space. In other aspects, the feed inlet line is fluidly connected with the interior space, and wherein the first porous rotor is positioned surrounding an interior space. The first porous rotor may be a selectively permeable material. In one embodiments, the selectively-permeable material is made with, impregnated with, or coated with an additional catalyst. In another embodiment, the selectively-permeable material comprises sintered metal or ceramic.

The apparatus may include the feed inlet line extending into the interior space. In on aspect, the feed inlet line extends into a vertically central portion of the interior space. The apparatus may include a second porous rotor concentric with the first porous rotor, wherein the second porous rotor comprises a second catalyst. There may be feed inlet line fluidly connected with the interior space, and the second porous rotor may be positioned surrounding a second interior space. The apparatus may also include an outlet line, wherein the outlet line is fluidly connected with the second interior space. In some aspects, the first catalyst and the second catalyst are the same. In other aspects, the first catalyst and the second catalyst are different.

Embodiments may pertain to a system having a plurality of apparatuses disclosed herein.

Other embodiments may pertain to a method of producing a product of a gaseous reaction that includes the steps of contacting a feed gas comprising at least one gaseous reactant with a rotor wherein the rotor is permeable to the at least one gaseous reactant, and wherein the rotor comprises a catalyst effective for catalyzing the gaseous reaction; and extracting the product from an outlet side of the rotor. The method may include rotating the rotor about an axis of rotation at a rotational frequency.

The method may also include passing the product through a second rotor from an inlet side, wherein the second rotor is permeable to the product, and wherein the second rotor is made from or contains additional catalyst effective for catalyzing a second reaction.

In some aspects, the rotor is cylindrical and porous. In other aspects, rotor comprises sintered metal or ceramic. The sintered metal or ceramic may be made with, impregnated with, or coated with catalyst.

These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

In the figures, like numerals are used to refer to like components.

NOTATION AND NOMENCLATURE

As used herein, the terms "reactive centrifuge" and "catalytic centrifuge" when used in reference to an apparatus of this disclosure are used to indicate that the apparatus is configured for integration of centrifugation with catalytic functionality.

The phrase, "porous, catalytic rotor" as used herein refers to a rotor which is not impermeable to gas and which is made of or contains therein at least one catalytic material.

DETAILED DESCRIPTION

I. Overview. Herein disclosed are a system and method of reacting gaseous components to produce a desired product. The disclosed system and method provide for integration of centrifugation with catalysis, enhancing gas phase reaction to produce a desired product. Although described hereinbelow with respect to a porous, catalytic rotor, it is envisaged that, in applications, the centrifugation itself will be sufficient to allow a desired reaction, and, in such instances, the porous rotor may not be made from or contain therein catalyst. The system and method are applicable to any number of a wide variety of reactions for which reactants can be provided in gas phase (or converted thereto within the reactor) and/or for which suitable catalyst is available. Introducing a non homogenous catalyst, including abrasive ones, via the feed of a rotating high shear reactor can cause severe abrasion of the reactor parts. The system of this disclosure overcomes this by eliminating or minimizing the need for abrasive catalyst in the feed stream by, in embodiments, placing catalytic surfaces at the point where cavitation conditions are likely to exist.

Figure 1:
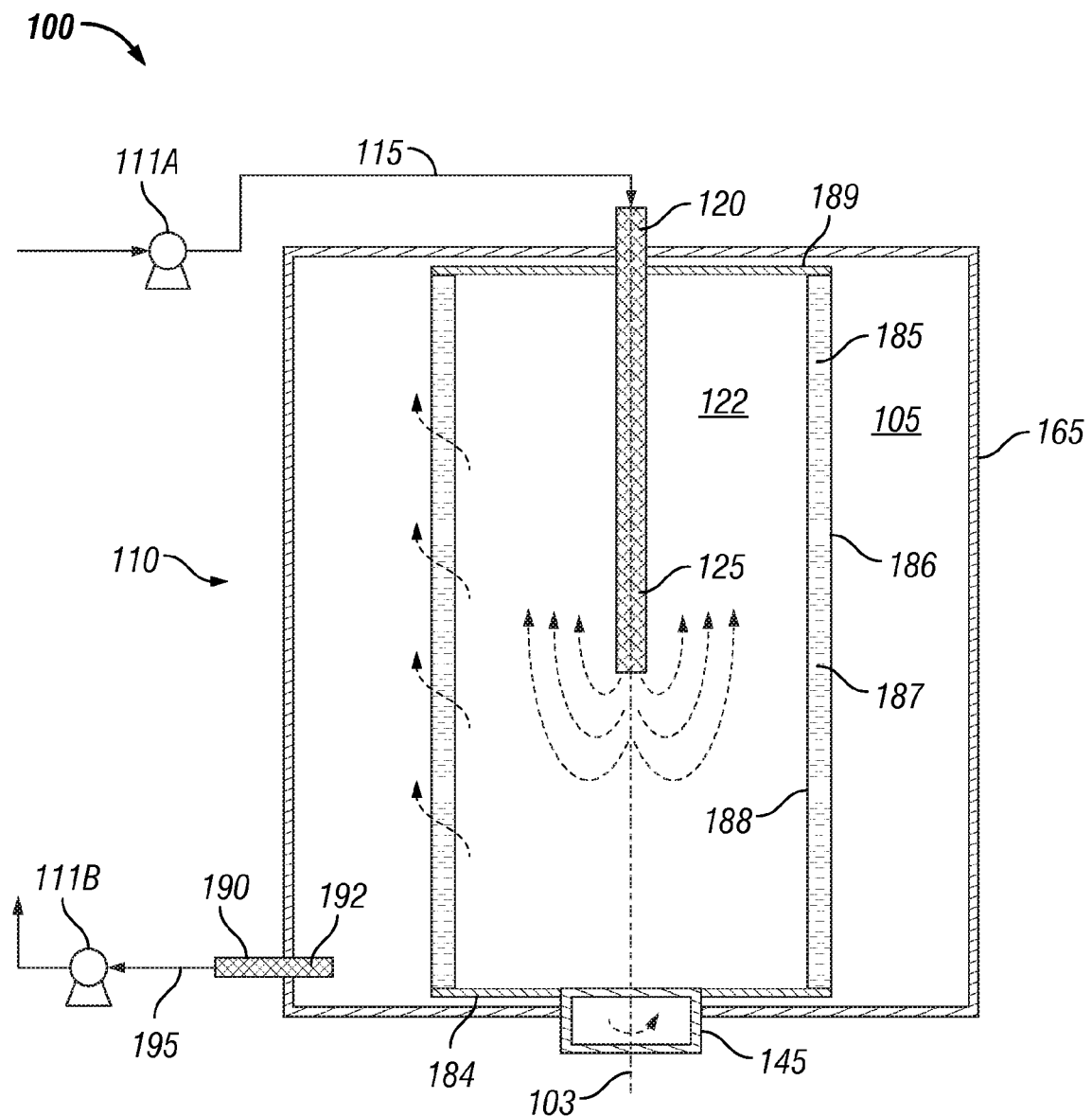
FIG. 1 is a schematic of a system according to an embodiment of this disclosure.

II. System for Gas Reaction. The reactive centrifugation system of this disclosure comprises at least one catalytic centrifuge. The at least one catalytic centrifuge comprises at least one porous, catalytic rotor. A system for gas reaction according to this disclosure will now be described with reference to FIG. 1. FIG. 1 is a schematic of a reactive centrifugation system 100 according to an embodiment of this disclosure. Reactive centrifugation system 100 comprises catalytic centrifuge 110.

Each of the one or more catalytic centrifuges of the disclosed system comprises an outer casing, at least one porous, catalytic rotor, at least one feed inlet line, and at least one product outlet line. In the embodiment of FIG. 1, catalytic centrifuge 110 comprises outer casing 165, catalytic rotor 185, feed inlet line 120, and product outlet line 190.

Each of the one or more catalytic centrifuges of the disclosed system comprises an outer casing. As indicated in FIG. 1, outer casing 165 surrounds rotor 185. Outer casing 165 may be cylindrical on its outer and/or inner surfaces. Outer casing 165 can be made out of specific materials to prevent harmful materials from hurting users of the catalytic centrifuge. In applications, components of catalytic centrifuge 110, such as casing 165, are made of stainless steel. By providing an enclosed vessel, the temperature and pressure within each catalytic centrifuge are adjusted as desired within design limitations. Catalytic centrifuge 110 may be operable at pressures up to at least 15 psig, 500 psig, 1000 psig or 1455 psig. Catalytic centrifuge 110 may be operable at pressures up to 100 atm. Catalytic centrifuge 110 may be operable at temperatures up to 150° C., 200° C., 250° C., 300° C., 400° C., 450° C., 500° C., 550° C., or up to about 600° C.

Each of the one or more catalytic centrifuges comprises at least one porous catalytic rotor. As indicated in the embodiment of FIG. 1, porous catalytic rotor 185 is symmetrically positioned within casing 165 about an axis of rotation 103. The porous catalytic rotor 185 is positioned within outer casing 165 such that a clearance or annular space 105 is created between outer wall 186 of catalytic rotor 185 and the inner surface of outer casing 165. Rotor 185 surrounds an interior space 122 configured such that the interior space 122 may be evacuated of air prior to use to provide near frictionless rotation when operating.

Figure 2:
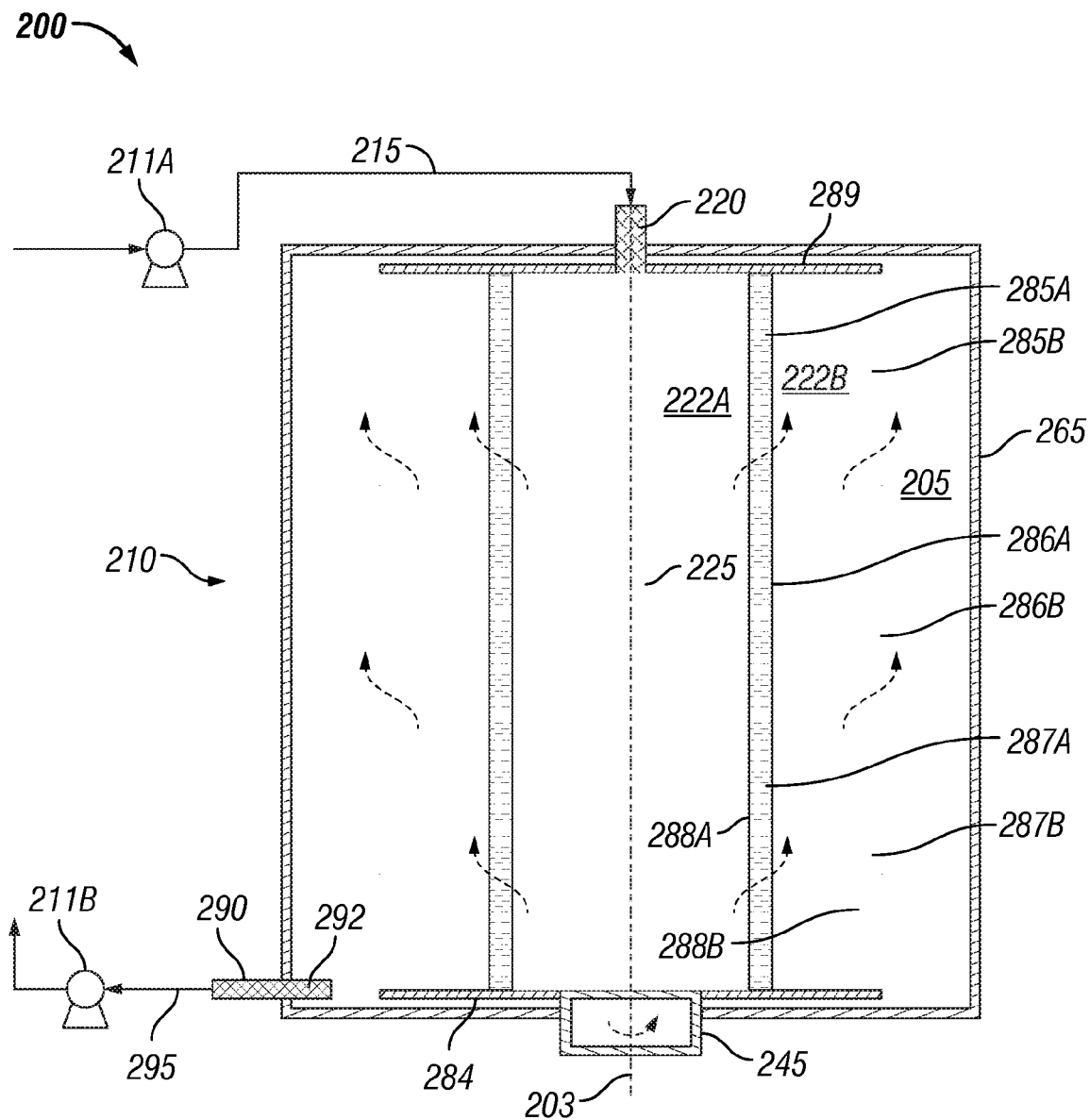
FIG. 2 is a schematic of a system according to another embodiment of this disclosure.

FIG. 2 is a schematic of a system 200 according to another embodiment of this disclosure. System 200 comprises catalytic centrifuge 210. Catalytic centrifuge 210 comprises outer casing 265, inner porous catalytic rotor 285A, outer porous catalytic rotor 285B, feed inlet line 220, product outlet line 290. Outer porous catalytic rotor 285B is positioned within outer casing 265 such that a clearance or annular space 205 is created between outer wall 286B of outer porous catalytic rotor 285B and the inner surface of outer casing 265. Inner porous catalytic rotor 285A is separated by an interior space 222B from outer porous catalytic rotor 285B and surrounds an interior space 222A. Interior spaces 222A and 222B may be configured such that the interior spaces can be evacuated of air prior to use to provide near frictionless rotation when operating.

Figure 3A:
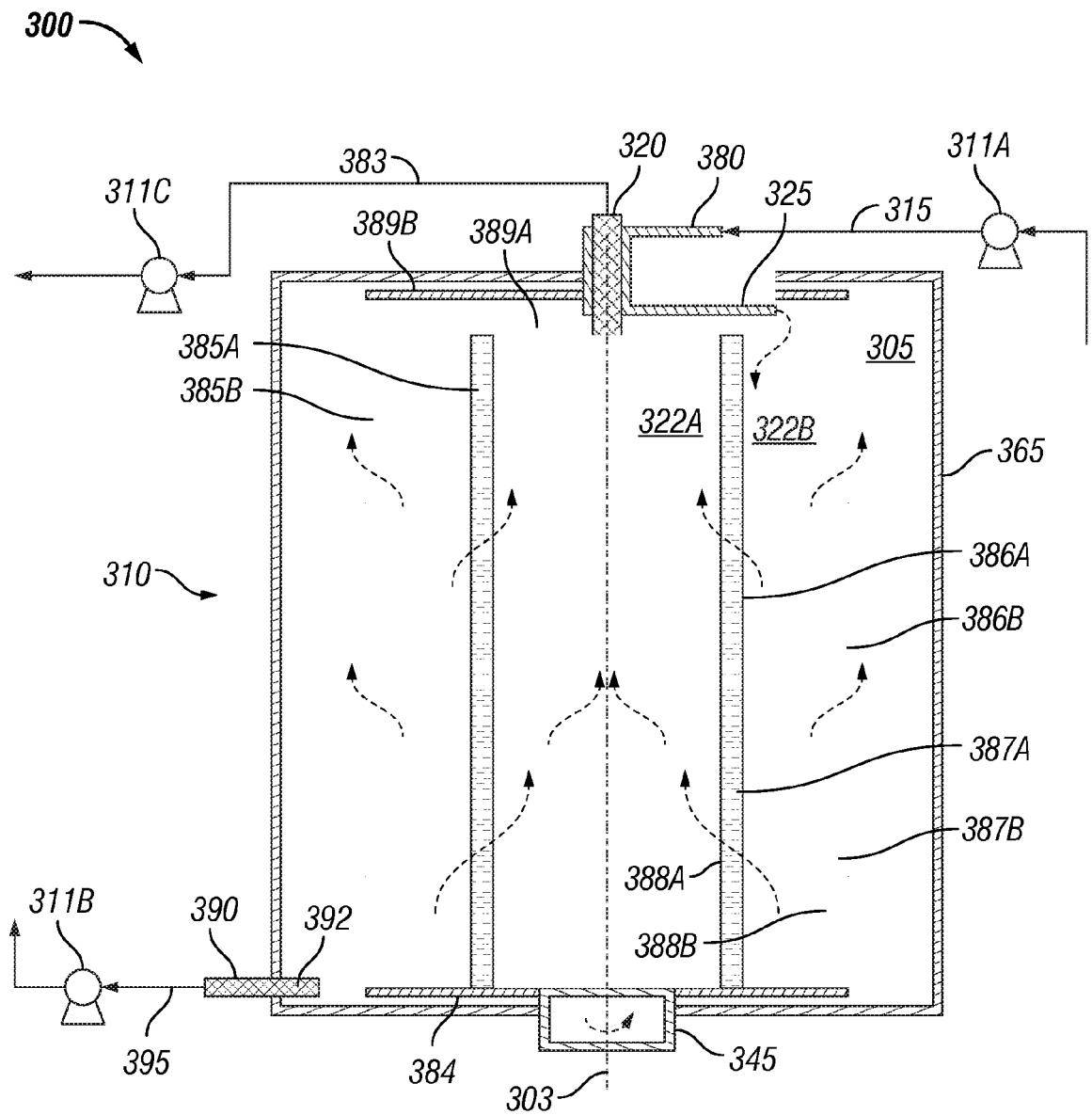
FIG. 3A is a schematic of a system according to another embodiment of this disclosure.
Figure 3B:
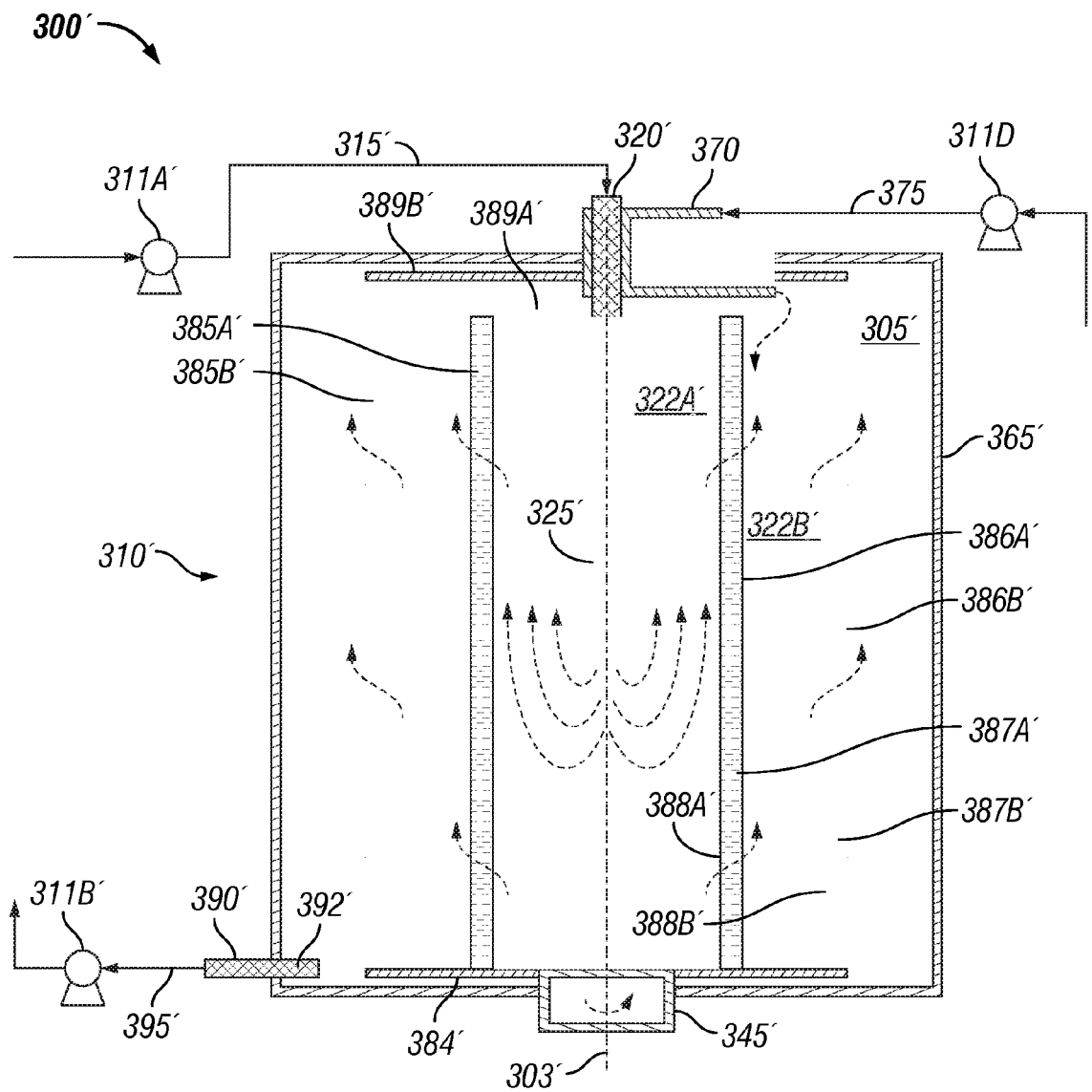
FIG. 3B is a schematic of a system according to another embodiment of this disclosure.
Figure 3C:
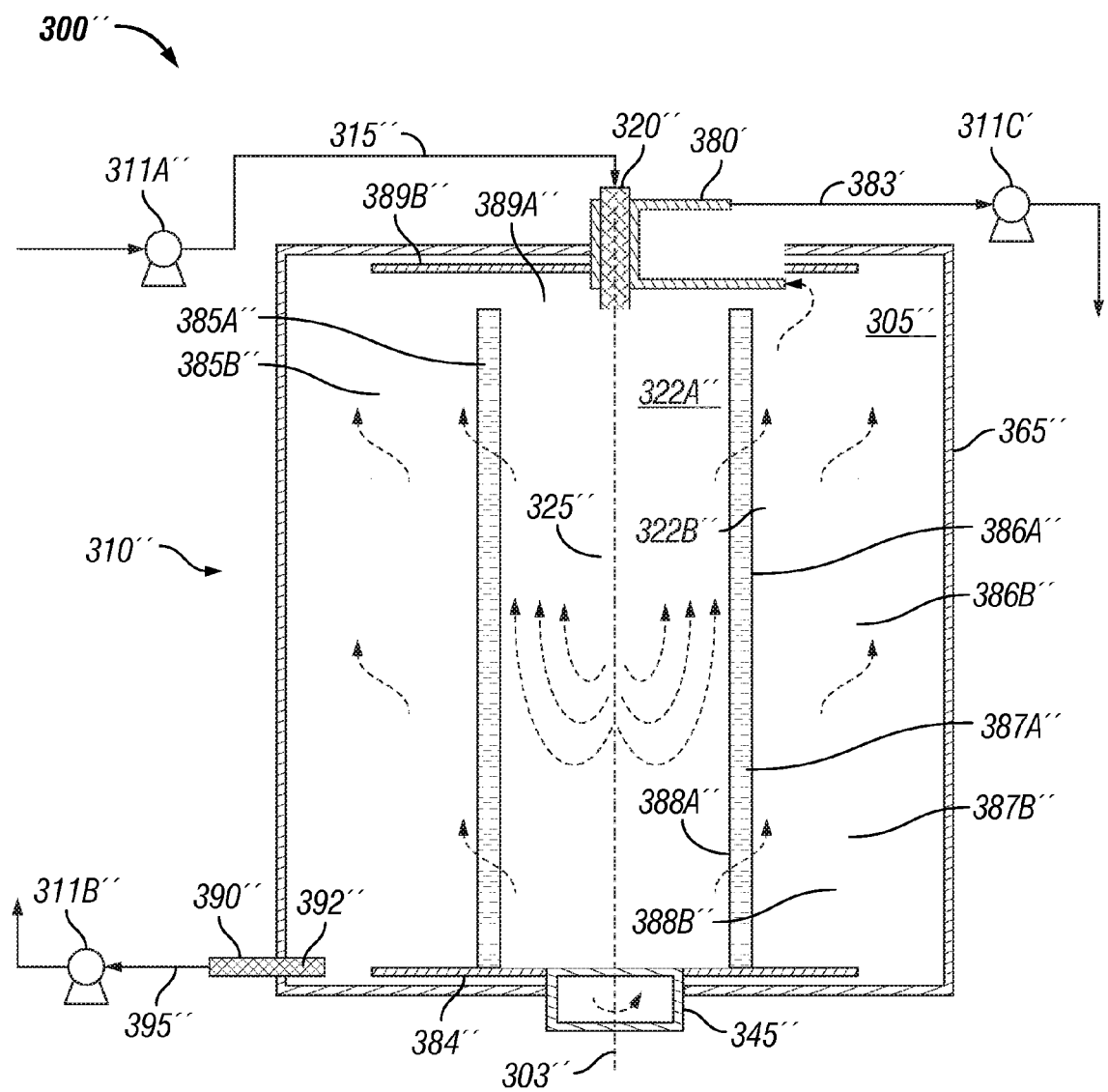
FIG. 3C is a schematic of a system according to another embodiment of this disclosure.

FIGS. 3A-3C provide schematics of embodiments of systems according to this disclosure wherein the catalytic centrifuge comprises two rotors and an additional inlet line or an additional outlet line. The systems 300, 300', 300" of FIGS. 3A, 3B, and 3C respectively comprise catalytic centrifuges 310, 310', and 310". Catalytic centrifuge comprises outer casing 365 (365', 365"), inner porous catalytic rotor 385A (385A', 385A"), outer porous catalytic rotor 385B (385B', 385B"), feed inlet line 320 (320', 320"), product outlet line 390 (390', 390"). Outer porous catalytic rotor 385B (385B', 385B") is positioned within outer casing 365 (365', 365") such that a clearance or annular space 305 (305', 305") is created between outer wall 386B (386B', 386B") of outer porous catalytic rotor 385B (385B', 385B") and the inner surface of outer casing 365 (365', 365"). Inner porous catalytic rotor 385A (385A', 385A") is separated by an interior space 322B (322B', 322B") from outer porous catalytic rotor 385B (385B', 385B") and surrounds an interior space 322A (322A', 322A"). Interior spaces 322A (322A', 322A") and 322B (322B', 322B") may be configured such that the interior spaces can be evacuated of air prior to use to provide near frictionless rotation when operating.

Porous Catalytic Rotor. The porous catalytic rotor may be tubular in shape, e.g. a sintered metal tube. The porous catalytic rotor (185, 285A, 285B, 385A, 385B, 385A', 385B', 385A", 385B") is designed such that it is permeable to gaseous components and may provide at least one catalytic functionality. The porous catalytic rotor may comprise or contain sintered metal. The rotor may be made of or may contain a permeable material. The permeable material may be tailored for a desired pore size and porosity having integral strength to withstand a desired operational rotation. In applications, the rotor comprises carbon fiber. In applications, the rotor also has catalytic functionality. In such embodiments, the rotor is made from or contains therein at least one catalytic metal or metal salt.

In embodiments, a catalytic permeable material 187 is sandwiched between an outer support 186 and an inner support 188 of rotor 185. For example outer wall 186 and inner wall 188 of rotor 185 may be a support material. For example, the porous catalytic material of rotor 185 may be sandwiched between supports to provide increased strength thereto. The inner and outer supports may resemble a basket of support material in which the porous catalytic material is sandwiched. The inner and outer supports may be configured as a mesh basket (e.g., a stainless steel mesh basket) in which the porous catalytic material is sandwiched. The inner and outer supports may be any material known to provide support and through which gas may readily pass. Top 189 (289, 389A, 389B, 389K, 389W, 389K', 389B") and bottom 184 (284, 384', 384") of rotor 185 (285, 385A, 385B, 385A', 386B', 385A", 385B") may be impermeable, or may be porous catalytic material. The bottom of the inner and outer rotors may or may not be integrated.

In embodiments, the porous catalytic material is formed by placing metal powder, e.g. stainless steel powder, in a mold and pressing it under high pressure. In embodiments, pressures of greater than 20,000 psig are utilized to compress the powder and form the porous material. In embodiments, pressures of greater than 50,000 psig are utilized to compress the powder and form the porous material. In embodiments, pressures of up to 150,000 psig are utilized to compress the powder and form the porous material. Pressing may reduce the thickness of a starting powder by at least 60%. The pressed material may then be calcined in an oven. To avoid shrinkage during formation, the material may be brought to a temperature approaching, but less than, the melt temperature, and cool down may be controlled over a sufficient duration to avoid/minimize shrinkage. Control of temperature during formation of the porous catalytic material of the rotor may also hinder the formation of oxides.

Catalyst functionality may be provided to the rotor by adding one or more catalyst metal or metal salt to the powder prior to pressing. For example, one or more catalytic material may be added to a metal powder, calcined, and then pressed to make the sintered material. Alternatively, catalyst functionality can be added following formation of the porous material. For example, in embodiments, a sintered material is formed and then coated or impregnated with one or more metal catalyst. The impregnated material may then be calcined.

The porous material of the rotor may be custom-tailored to provide gas flow paths of a desired tortuousity, porosity (density) and average pore size of the material. For example, a powder may be pressed into a honeycomb structure or wax added and subsequently calcined to remove the honeycomb or wax structure and leave honeycomb- or other patterned tailored paths or voids within the porous material of the rotor. For example, a loofah sponge or a synthetic sponge is placed in a metal casing/support, a catalyst powder is pressed into the casing/support within which is the sponge. Then the sponge is removed by calcining the casing so that a porous catalytic rotor is formed with voids and paths and channels defined by the sponge placed within. It is contemplated that any sponge or lacy structure may be used in this manner to construct the porous catalytic material for the rotor—organic or inorganic, synthetic or natural. In some embodiments, the porous catalytic rotor has voids, and/or paths, and/or channels that are regular. In some other embodiments, the porous catalytic rotor has voids, and/or paths, and/or channels that are random. In embodiments, the desired surface contact area of gaseous reactant(s) with the catalyst during operation of the reactive centrifuge is obtained by the construction of the porous catalytic rotor, which is custom-tailored for each specific application/reaction.

Suitable material from which the porous rotor may be formed is, for example, ceramic or stainless steel. In embodiments, the porous material comprises 316 stainless steel. In embodiments, the density of the selectively-permeable material is in the range of from about 3 g/cm³ to about 6 g/cm³. In applications, the density of the selectively-permeable material is greater than about 3 g/cm³, 3.5 g/cm³, 4 g/cm³, 4.5 g/cm³, 5 g/cm³, or 6 g/cm³. In applications, the density of the selectively permeable material is about 3.5 g/cm³, 4 g/cm³, 4.5 g/cm³, 5 g/cm³, or 5.5 g/cm³. In embodiments, the average pore size of the selectively permeable material is less than about 200 μm, less than about 50 μm, less than about 20 μm, less than about 10 μm, less than about 5 μm, less than about 3 μm, less than about 1 μm, or less than about 0.5 μm. In embodiments, the average pore size is in the range of Angstroms.

Each porous catalytic rotor may have a diameter and length determined to be suitable for a certain application, and the reactive centrifuge may have any desired nominal size. As such, the dimensions given are not meant to be limiting. In applications, each porous catalytic rotor may have a diameter in the range of from about 2 inches to about 12 inches, from about 4 inches to about 10 inches, from about 4 inches to about 8 inches, or from about 4 inches to about 6 inches. The rotor may have a vertical length in the range of from about 8 inches to about 20 inches, from about 10 inches to about 17 inches, or from about 12 inches to about 15 inches. The nominal capacity of the reactive centrifuge 110, 210, 310 may be about 10 gallons, about 5 gallons, or about 1 gallon. The thickness of the porous catalytic material may be tailored to provide a desired surface area. In embodiments, the porous catalytic material or rotor has a thickness of about ¼-inch, about ½-inch, about ¾-inch, or about 1-inch.

A desired permeability or average pore size may be obtained by providing a sintered material of a certain pore size (e.g., 30 to 100 μm) and subsequently treating the sintered material with molecular sieve or membrane. The external surfaces of the sintered metal material may be covered with one or more layers of molecular sieve. Suitable molecular sieves include, without limitation, carbon sieves, ALPOS, SAPOS, silicas, titanium silicates, and zeolites. In embodiments, the molecular sieve has a pore size in the range of from 3 angstrom (Å) to about 20 Å (about 0.3 nm to about 2 nm). The coating may be applied via methods similar to methods utilized to prepare catalyst surfaces on monolith and/or honeycomb catalytic converters that are used on automobile mufflers.

Rotor 185 provides catalytic functionality to catalytic centrifuge 185. Rotor 185 is made from or contains therein one or more catalyst. The catalyst may be integrated into the porous material during formation thereof, or applied to and/or within the porous material following formation thereof. In embodiments, porous catalytic rotor 185 comprises a sintered material (or a sintered material coated with molecular sieve) impregnated or coated with one or more catalyst. The catalyst may be selected from elemental metals and metal salts. The catalyst with which the sintered material is impregnated or coated or co-formed may be any suitable catalyst, for example, a palladium silica catalyst or platinum silica catalyst. In applications, the catalyst is functional for conversion of light gas to higher hydrocarbons. The disclosed system could also benefit other chemical reactions involving gases or liquids where high shear induces cavitation resulting in extreme temperatures and pressures in the presence of a catalytic surface.

The at least one catalytic centrifuge of the disclosed system further comprises at least one feed inlet line. System 100 of the embodiment of FIG. 1 comprises feed inlet line 120. Feed inlet line 120 is configured to introduce feed gas into the interior space 122 defined by porous catalytic rotor 185. One end 125 of feed inlet line 120 is in fluid communication with interior space 122 of catalytic centrifuge 110. In embodiments, outlet end 125 of feed inlet line 120 is positioned within a vertically central portion of interior space 122. Desirably, outlet end 125 is positioned proximal to axis of rotation 103. The other end of feed inlet line 120 is configured for introduction of reactant feed gas into interior region 122 delineated by rotor 185. In embodiments, the outlet end 125 and/or the other (inlet) end of feed inlet line 120 has a diameter of ½ inch, ¾ inch, or 1-inch.

In the embodiment of FIG. 2, system 200 comprises feed inlet line 220. Feed inlet line 220 is configured to introduce feed gas into the interior space 222A defined by porous catalytic rotor 285A. One end 225 of feed inlet line 220 is in fluid communication with interior space 222A of catalytic centrifuge 210. In embodiments, outlet end 225 of feed inlet line 220 is positioned within a vertically central portion of interior space 222A. Desirably, outlet end 225 is positioned proximal to axis of rotation 203. In embodiments, the outlet (225) and/or the other (inlet) end of feed inlet line 220 has a diameter of ½ inch, ¾ inch, or 1-inch.

As indicated in FIG. 3A, the feed inlet line of a system 300 according to this disclosure may comprise a feed inlet line 320 in fluid communication with interior space 322B between outer wall 386A of inner porous catalytic rotor 385A and inner wall 388B of outer porous catalytic rotor 385B. In embodiments, the outlet end 325 of feed inlet line 320 is positioned below top 389B of outer rotor 385B. In embodiments, the outlet end 325 of feed inlet line 320 is positioned below top 389A of outer rotor 385A. In embodiments, the outlet end 325 of feed inlet line 320 is vertically positioned above top 389A of inner rotor 385A and below top 389B of outer rotor 385B. In embodiments, outlet end 325 of feed inlet line 320 is positioned between outer wall 386A of inner rotor 385A and inner wall 388B of outer rotor 385B. In embodiments, the outlet and/or the other (inlet) end of feed inlet line 320 has a diameter of ½ inch, ¾ inch, or 1-inch.

A catalytic centrifuge of a gas reaction system according to this disclosure may further comprise one or more additional inlet lines. As indicated in FIG. 3B, a system 300' according to an embodiment comprises feed inlet line 320' configured to introduce feed gas into the interior space 322A' defined by porous catalytic rotor 385A'. One end 325' of feed inlet line 320' is in fluid communication with interior space 322A' of catalytic centrifuge 310'. In embodiments, outlet end 325' of feed inlet line 320' is positioned within a vertically central portion of interior space 322A'. Desirably, outlet end 325' is positioned proximal to axis of rotation 303. In embodiments, the outlet end 325' and/or the other (inlet) end of feed inlet line 320' has a diameter of ½ inch, ¾ inch, or 1-inch. System 300 further comprises an additional inlet line 370 in fluid communication with interior space 322B' between outer wall 386A' of inner porous catalytic rotor 385A' and inner wall 388B' of outer porous catalytic rotor 385B'. Such a configuration may be useful for adding additional reactant, inert, or water vapor 375 into interior space 322B'. In embodiments, the outlet end of additional inlet line 370 is positioned horizontally between outer wall 386A' of inner rotor 385A' and inner wall 388B' of outer rotor 385B'. In embodiments, the outlet end of inlet line 370 is positioned below top 389B' of outer rotor 385B'. In embodiments, the outlet end of inlet line 370 is positioned below top 389A' of outer rotor 385A'. In embodiments, the outlet end of inlet line 370 is vertically positioned above top 389A' of inner rotor 385A' and below top 389B' of outer rotor 385B'.

The catalytic centrifugation system of this disclosure further comprises a motor coupled to the at least one porous catalytic rotor of the at least one catalytic centrifuge and configured to provide rotation of the at least one porous catalytic rotor about an axis of rotation. Rotation of the rotor(s) applies reactive centrifugal force to the feed gas within the rotor(s). In the embodiment of FIG. 1, for example, motor 145 is coupled to rotor 185 and is capable of rotating rotor 185 about axis of rotation 103. In the embodiment of FIG. 2, motor 245 is coupled to rotors 285A and 285B and is capable of rotating the rotors about axis of rotation 203. In the embodiments of FIGS. 3A, 3B, and 3C, motors 345, 345', 345" are coupled respectively to rotors 385A, 385A', 385A" and 385B, 385B', 385B" and are capable of rotating the rotors about axis of rotation 303, 303', 303". In embodiments in which a catalytic centrifuge comprises two or more rotors, one or more rotor may be rotatable in a direction opposite to that of at least one other rotor. For example, in the embodiment of FIG. 2, inner rotor 285A and outer rotor 285B may be coupled to motor 245 via gears such that inner rotor 285A is rotatable in a clockwise direction and outer rotor 285B is rotatable in a counter-clockwise direction. The high speed motor may be capable of rotational frequencies of up to 90,000 RPM. Alternatively, some other means may provide the high rotational frequency. In embodiments, the high speed motor is capable of producing rotational frequencies of at least 5-, 7-, 7.5-, 10-, 15-, 20-, 25-, 30-, 40-, 50-, 60-, 70-, 80-, or 90-thousand revolutions per minute (RPM).

Each of the one or more catalytic centrifuges of the disclosed system further comprises at least one product outlet line configured for removing product of a desired gaseous reaction from the catalytic centrifuge. In the embodiment of FIG. 1, system 100 comprises product outlet line 190. The inner surface of casing 165 and the outer surface 186 of porous catalytic rotor 185 create an annular region 105 therebetween. Product outlet line 190 comprises one (inlet) end 192 in fluid communication with annular space 105. End 192 of product outlet line 190 may be vertically positioned anywhere within annular space 105, for example, towards the top, bottom, or center of annular region 105. In embodiments, end 192 of product outlet line 190 is positioned proximal the inner surface of casing 165. Alternatively, end 192 of product outlet line 190 is positioned distal the inner surface of casing 165. Alternatively, end 192 of product outlet line 190 is horizontally positioned substantially between the inner surface of casing 165 and outer surface 186 of rotor 185. In embodiments, inlet end 192 and/or the other (outlet) end of product outlet line 190 has a diameter of ½ inch, ¾ inch, or 1-inch.

In the embodiment of FIG. 2, catalytic centrifuge 210 of system 200 comprises product outlet line 290. The inner surface of casing 265 and the outer surface 286B of outer porous catalytic rotor 285B create an annular space 205 therebetween. Product outlet line 290 is configured for removal of reaction product from annular space 205. Product outlet line 290 comprises one (inlet) end 292A in fluid communication with annular space 205. End 292A of product outlet line 290 may be vertically positioned anywhere within annular space 205, for example, towards the top, bottom, or center of annular region 205. In embodiments, end 292A of product outlet line 290 is positioned proximal the inner surface of casing 265. Alternatively, end 292A of product outlet line 290 is positioned distal the inner surface of casing 265. Alternatively, end 292A of product outlet line 290 is horizontally positioned substantially between the inner surface of casing 265 and outer surface 286B of outer rotor 285B. In embodiments, inlet end 292 and/or the other (outlet) end of product outlet line 290 has a diameter of ½ inch, ¾ inch, or 1-inch.

Each of the one or more catalytic centrifuges of the disclosed system may further comprise one or additional product outlet lines configured for removing product of the desired gaseous reaction from the catalytic centrifuge. As indicated in the embodiment of FIG. 3A, for example, a catalytic centrifuge 310 may comprise a product outlet line 390 configured for removal of reaction product from annular space 305. Product outlet line 390 comprises one (inlet) end 392 in fluid communication with annular space 305. End 392 of product outlet line 390 may be vertically positioned anywhere within annular space 305, for example, towards the top, bottom, or center of annular region 305. In embodiments, end 392 of product outlet line 390 is positioned proximal the inner surface of casing 365. Alternatively, end 392 of product outlet line 290 is positioned distal the inner surface of casing 365. Alternatively, end 392 of product outlet line 390A is horizontally positioned substantially between the inner surface of casing 365 and outer surface 386B of rotor 385B. Catalytic centrifuge 310 further comprises an outlet line 380 configured for removal of reaction product from interior space 322A. Product outlet line 380 comprises one (inlet) end in fluid communication with interior space 322A. The inlet end of product outlet line 380 is positioned coincident with the axis of rotation 303. The inlet end of product line 380 may be vertically positioned toward the top 389A, the bottom 384 or the center of interior space 322A.

As indicated in the embodiment of FIG. 3C, a catalytic centrifuge 310" may comprise a product outlet line 390" configured for removal of reaction product from annular space 305". Product outlet line 390" comprises one (inlet) end 392" in fluid communication with annular space 305". End 392" of product outlet line 390" may be vertically positioned anywhere within annular space 305", for example, towards the top, bottom, or center of annular region 305". In embodiments, end 392" of product outlet line 390" is positioned proximal the inner surface of casing 365". Alternatively, end 392" of product outlet line 390" is positioned distal the inner surface of casing 365". Alternatively, end 392" of product outlet line 390" is horizontally positioned substantially between the inner surface of casing 365" and outer surface 386B" of outer rotor 385B". Catalytic centrifuge 310" further comprises an additional outlet line 380' configured for removal of reaction product from interior space 322B". Product outlet line 380' comprises one (inlet) end in fluid communication with interior space 322B". The inlet end of product outlet line 380' may be vertically positioned below top 389B" of outer rotor 385B". The inlet end of product outlet line 380' may be vertically positioned below top 389A" of outer rotor 385A". In embodiments, the inlet end of product outlet line 380' in fluid communication with interior space 322B" is positioned vertically between the top 389A" and top 389B" of rotors 385A" and 385B" respectively. The inlet end of product outlet line 380' may be horizontally positioned between outer wall 386A" of inner rotor 385A" and inner wall 388B" of outer rotor 385B".

The reactive centrifugation system may further comprise one or more pumps. The one or more pumps may be used to pressurize the catalytic centrifuge and enhance flow therethrough. For example, in the embodiments of FIGS. 1 and 2, reactive centrifugation systems 100 and 200 respectively comprise two pumps, 111A/111B and 211A/211B respectively. Pump 111A/211A is positioned on feed inlet line 120/220 and may serve to force feed materials into catalytic centrifuge 110/210 under pressure. Pump 111B/211B may be positioned on product outlet line 190/290 and may serve to provide vacuum removal of product from annular space 105/205.

The system may comprise more than two pumps. For example, system 300 of FIG. 3A comprises three pumps, 311A, 311B, and 311C. Pump 311A is positioned on feed inlet line 320 and may serve to force feed materials into catalytic centrifuge 310 under pressure. Pump 311B may be positioned on product outlet line 390 and may serve to provide vacuum removal of product from annular space 305. A pump 311C may be positioned on a second product outlet line 383 and serve to remove product from interior space 322A under vacuum.

In the embodiment of FIG. 3B, system 300' comprises three pumps, 311A', 311B', and 311D. Pump 311A' is positioned on feed inlet line 320' and may serve to force feed materials into catalytic centrifuge 310' under pressure. Pump 311B' may be positioned on product outlet line 390' and may serve to provide vacuum removal of product from annular space 305'. A pump 311D may be positioned on second reactant inlet line 375 and serve to introduce a component into interior space 322B' under pressure.

In the embodiment of FIG. 3C, system 300" comprises three pumps, 311A", 311B", and 311C'. Pump 311A" is positioned on feed inlet line 320" and may serve to force feed materials into catalytic centrifuge 310" under pressure. Pump 311B" may be positioned on product outlet line 390" and may serve to provide vacuum removal of product from annular space 305". A pump 311C' may be positioned on a second product outlet line 380' and serve to remove product from interior space 322B" via vacuum.

Heaters. It is envisaged that, for certain applications, all or portions of catalytic centrifuge 110, 210, 310 may be heated to enhance reaction of gaseous components. For example, all or portions of casing 165, 265, 365 may be heated using apparatus and methods as known in the art.

The system of this disclosure may comprise two or more reactive centrifuges. The two or more reactive centrifuges may be configured in series and/or in parallel. In embodiments, a first reactive centrifuge of the system comprises a porous catalytic rotor having a first catalytic property while a second catalytic centrifuge of the series comprises a porous catalytic rotor having a second catalytic functionality. In embodiments, the product gas from a first catalytic centrifuge is introduced as feed gas into a second catalytic centrifuge comprising a rotor with a different catalytic functionality. In such embodiments, inter-stage gas addition is envisioned. Systems comprising catalytic centrifuges comprising two or more porous catalytic rotors and systems comprising multiple catalytic centrifuges in series may be operable to perform multiple reactions and/or enhance the extent of a desired reaction. The reactor can be configured with multiple porous rotating centrifuges within one reactor. In embodiments, rotating porous cylinders of differing diameters are configured to rotate clockwise or counterclockwise around one another. Each rotating porous cylinder can have the same or a different catalytic surface to catalyze the same or a different reaction. In such embodiments, it is envisioned that additional feed (i.e. gas) can be introduced into the annular space between the rotating porous cylinders as desired.

III. Production of Desired Product by Reactive Centrifugation. A method of producing desired product of gas phase reaction according to this disclosure will now be made with reference to FIG. 1. A gaseous feed 115 is introduced into catalytic centrifuge 110 via feed inlet line 120. The feed gas is introduced via inlet line 120 into interior space 122 contained within the walls of catalytic rotor 185. In embodiments, the feed gas is introduced to a vertically central portion of interior space 122. The feed gas is introduced into interior region 122 proximal axis of rotation 103. Motor 145 causes rotation of porous catalytic rotor 185 about axis of rotation 103. The porous catalytic rotor may be rotated at a rotational frequency of up to at least 5-, 7-, 7.5-, 10-, 15-, 20-, 25-, 30-, 40-, 50-, 60-, 70-, 80-, or 90-thousand RPM. Reactive centrifugal force is applied to the gas introduced into catalytic centrifuge 110, forcing the gas into the pores of porous catalytic rotor 185.

As discussed hereinabove porous catalytic rotor 185 is made of or contains porous catalytic material through which gas must pass in order to enter annular region 105 of catalytic centrifuge 110. The pores of the rotor may be tailored to provide optimal surface area for interaction of gas feed with catalyst. Within porous catalytic rotor 185, the feed gas encounters catalytic material at a high velocity and high rate of shear. At sufficiently high rotational frequencies, feed gas may break prior to entering the catalytic rotor, for example, carbon dioxide may break into carbon monoxide and highly reactive oxygen prior to entering catalytic rotor 185. The operating temperature and pressure may be selected based on the desired reaction. In applications, the operating temperature may be in the range of from about room temperature to about 600° C. In applications, the operating temperature is in the range of from about 100° C. or 150° C. to about 300° C., 400° C., or 500° C. The pressure may be a desired pressure within the limits of the design materials.

The feed gas may comprise one or more of hydrogen, methane, ethane, propane, butane, carbon dioxide, carbon monoxide, $H_2O$, another inert gas or hydrocarbon gas or another gaseous reactant. Higher molecular weight components may be produced from these components via the disclosed method. Utilization of high temperatures may allow gas phase reaction of products which are not gaseous at room temperature. For example, utilization of elevated temperature may allow feed gas comprising gaseous gasoline or diesel. Such a feed gas may be desulfurized at high temperature (400° C. to 500° C.) and the catalytic rotor may comprise desulfurization catalyst. The feed gas may further comprise $H_2O$ and/or inerts in addition to reactant gas. Inert gas may be selected from, for example, helium and nitrogen. The introduction of $H_2O$ with the feed gas may be used, for example, to provide hydrogen reactant. Due to the utilization of a catalytic centrifuge, a greater surface area of catalyst and thus more catalyst available for promoting reaction may allow operation of various reactions at lower temperatures and/or pressures than conventionally allowed.

Under certain pressure/temperature conditions the gas and/or conversion products may be converted to liquid in the reactor. In some instances a liquid may be fed to the reactor and converted to a gas under cavitation conditions as it is fed through the reactor. The extreme temperatures and pressures created during cavitation in combination with the presence of a catalytic surface may be expected to enhance chemical reactions accordingly.

Pump 111A may be used to apply pressure and force feed gas 115 into rotor 185. Within porous catalytic rotor 185, gas interacts with the catalyst and other gas molecules. Reaction product 195 is removed from annular space 105 via one or more outlet lines 190. Vacuum may be applied to annular space 105 via pump 111B, enhancing withdrawal of product via product outlet line 190. In embodiments, pump 111A and line 120 are used to remove undesired impurities from interior space 122 by application of vacuum.

Another method of producing a desired product will now be made with reference to FIG. 2. Gaseous feed 215 is introduced into catalytic centrifuge 210 via feed inlet line 220. The feed gas is introduced via inlet line 220 into interior space 222A contained within the walls of inner porous catalytic rotor 285A. In embodiments, the feed gas is introduced to a vertically central portion of interior space 222A. The feed gas is introduced into interior region 222A proximal axis of rotation 203. Motor 245 causes rotation of inner porous catalytic rotor 285A about axis of rotation 203. The porous catalytic rotor may be rotated at a rotational frequency of up to 5-, 7-, 7.5-, 10-, 15-, 20-, 25-, 30-, 40-, 50-, 60-, 70-, 80-, or 90-thousand RPM. Reactive centrifugal force is applied to the gas introduced into catalytic centrifuge 210, forcing the gas into the pores of inner porous catalytic rotor 285A. As discussed hereinabove inner porous catalytic rotor 285A is made of or contains a first porous catalytic material through which gas must pass in order to enter interior space 222B between outer surface 286A of inner catalytic rotor 285A and inner surface 288B of outer porous catalytic rotor 285B. First porous catalytic material comprises a first catalyst. The pores of inner rotor 285A may be tailored to provide optimal interaction of gas feed with the first catalyst. Within inner porous catalytic rotor 285A, the feed gas encounters the first catalytic material at a high rate of shear. Pump 211A may be used to apply pressure and force feed gas into inner porous catalytic rotor 285A. Within inner porous catalytic rotor 285A, feed gas interacts with the first catalyst and other gas molecules. A first product passing out of inner catalytic rotor 285A enters interior space 222B.

Gas entering second interior space 222B enters outer porous catalytic rotor 285B. As discussed hereinabove outer porous catalytic rotor 285B is made of or contains a second porous catalytic material through which gas must pass in order to enter annular space 205 between outer surface 286B of outer catalytic rotor 285B and the inner surface of casing 265. Second porous catalytic material comprises a second catalyst. The second catalyst may be the same as or different from the first catalyst. The pores of outer rotor 285B may be tailored to provide optimal interaction of gas introduced therein with the second catalyst. Within outer porous catalytic rotor 285B, the gas encounters the second catalytic material at a high rate of shear. Within outer porous catalytic rotor 285B, gas interacts with the second catalyst to produce a second product. A second product passes out of outer catalytic rotor 285B and enters annular space 205. The second product may be the same as or different from the first product.

Second reaction product 295 is removed from annular space 205 via one or more outlet lines 290. Vacuum may be applied to annular space 205 via pump 211B, enhancing withdrawal of second product 295 via second product outlet line 290.

Another method of producing a desired product will be made with reference to FIG. 3A. Gas feed 315 is introduced into catalytic centrifuge 310 via feed inlet line 320. The feed gas is introduced via inlet line 320 into interior space 322B between the outer wall 386A of inner porous catalytic rotor 385A and inner wall 388B of outer catalytic rotor 385B. The feed gas may be introduced at a location below top 389B of outer rotor 385B and substantially horizontally between outer surface 386A of inner rotor 385A and inner surface 388B of outer rotor 385B. Pump 311A may be used to introduce feed gas into interior space 322B under pressure.

Motor 345 causes rotation of inner porous catalytic rotor 385A and outer catalytic rotor 385B about axis of rotation 303. The rotors may rotate in the same or opposite direction about axis of rotation 303. The porous catalytic rotors may be rotated at a rotational frequency of up to 5-, 7-, 7.5-, 10-, 15-, 20-, 25-, 30-, 40-, 50-, 60-, 70-, 80-, or 90-thousand RPM. Gas passing into inner rotor 385A may be converted to a first product 383 which exits inner rotor 385A into interior space 322A. Vacuum 311C may be used to enhance extraction of first product from interior space 322A. Gas passing into outer rotor 385B may be converted to a second product 395 which may enter annular region 305. Vacuum 311B may be used to enhance extraction of second product 395 from annular region 305. Via application of pressure to line 390, gas may be given time to enter inner rotor 385A. Via application of pressure to line 380, gas may be forced through outer rotor 385B. Assist of vacuum and/or pressure may be utilized to control the desired reaction. In this manner, two different reactions having two different products may be performed substantially simultaneously.

Description of another method of producing product via gaseous reaction will now be made with reference to FIG. 3B. Gaseous feed 315' is introduced into catalytic centrifuge 310' via feed inlet line 320'. The feed gas is introduced via inlet line 320' into interior space 322A' contained within the walls of inner porous catalytic rotor 385A'. In embodiments, the feed gas is introduced to a vertically central portion of interior space 322A'. The feed gas is introduced into interior region 322A' proximal axis of rotation 303'. Motor 345' causes rotation of inner porous catalytic rotor 385A' about axis of rotation 303'. The porous catalytic rotor may be rotated at a rotational frequency of up to at least 5-, 7-, 7.5-, 10-, 15-, 20-, 25-, 30-, 40-, 50-, 60-, 70-, 80-, or 90-thousand RPM. Reactive centrifugal force is applied to the gas introduced into catalytic centrifuge 310', forcing the gas into the pores of inner porous catalytic rotor 385A'. As discussed hereinabove inner porous catalytic rotor 385A' is made of or contains a first porous catalytic material through which gas must pass in order to enter interior space 322B' between outer surface 386A' of inner catalytic rotor 385A' and inner surface 388B' of outer porous catalytic rotor 385B'. First porous catalytic material comprises a first catalyst. The pores of inner rotor 385A' may be tailored to provide optimal interaction of gas feed with the first catalyst. Within inner porous catalytic rotor 385A', the feed gas encounters the first catalytic material at a high rate of shear. Pump 311A' may be used to apply pressure and force feed gas into inner porous catalytic rotor 385A'. Within inner porous catalytic rotor 385A', feed gas interacts with the first catalyst and other gas molecules. A first product passing out of inner catalytic rotor 385A' enters interior space 322B'.

Gas entering second interior space 322B' enters outer porous catalytic rotor 385B'. Additional feed may be introduced as desired. As discussed hereinabove outer porous catalytic rotor 385B' is made of or contains a second porous catalytic material through which gas must pass in order to enter annular space 305' between outer surface 386B' of outer catalytic rotor 385B' and the inner surface of casing 365'. Second porous catalytic material comprises a second catalyst. The second catalyst may be the same as or different from the first catalyst. The pores of outer rotor 385B' may be tailored to provide optimal interaction of gas introduced therein with the second catalyst. Within outer porous catalytic rotor 385B', the gas encounters the second catalytic material at a high rate of shear. Within outer porous catalytic rotor 385B', gas interacts with the second catalyst to produce a second product. A second product passes out of outer catalytic rotor 385B' and enters annular space 305'. The second product may be the same as or different from the first product. Additional reactant 375 may be introduced into interior space 322B' via additional inlet line 370. Pump 311D may be used to introduce the additional reactant under pressure.

Second reaction product 395' is removed from annular space 305' via one or more outlet lines 390'. Vacuum may be applied to annular space 305' via pump 311B' to enhance withdrawal of second product via second product outlet line 390'. The second product may be the same or different from the first product.

As a modification to this process in which a configuration as in FIG. 3C is utilized, first product 383' may be removed from interior space 322B" via additional outlet line 380'. Pump 311C' may serve to enhance removal of product 383' via additional outlet line 380'.

The catalytic centrifugation process utilizes a design that allows gas to constantly flow in and out of catalytic centrifuge. Unlike most centrifuges which rely on batch processing, the disclosed catalytic centrifuge allows continuous or semi-continuous processing. In such applications, product may be continuously or semi-continuously extracted from annular regions and/or interior spaces via one or more outlet lines. In applications, an additional inlet line and an additional outlet line are both in fluid communication with interior space between the inner and outer rotors.

The catalytic centrifuge is designed for operation at a temperature specific to the reaction desired. Although not intended to be limiting, the reaction may be performed at a temperature in the range of from about 25° C. to about 600° C. In embodiments, reaction is performed at room temperature. By operating at elevated temperature, gas phase reactions of components which are normally liquids at room temperature can be performed via the disclosed system and method. For example, utilization of high temperature may allow reactions with diesel and gasoline.

Serial Operation. In embodiments of the gas reaction method, product gas from a first reactive centrifuge is introduced directly into a second catalytic centrifuge as feed gas thereto, while the product gas is still in reactive form. A fresh external feed gas may also be added to the reactive product gas. In this manner, serial and complex reactions may be performed.

Features/Advantages. Utilization of the disclosed system and method may allow conversion of a substantial amount of the rotational energy of the rotors to one or more desired reactions. In applications, the system and method allow greater than about 95% conversion of energy to reaction; alternatively, greater than about 97% conversion; alternatively, greater than about 99% conversion.

EXAMPLES

Example 1

A system comprising a catalytic centrifuge comprising a rotor catalytic for hydrodenitrogenation, hydrodesulfurization, or hydrodeoxygenation may be used to desulfurize, denitrogenate, and/or deoxygenate a feed gas.

Example 2

In embodiments, a catalytic rotor comprises reforming catalyst. For example, the rotor may comprise a catalyst effective for methane reforming or a catalyst effective for steam methane reforming. Suitable catalyst may be, for example, nickel copper catalyst or nickel silica catalyst. In such embodiments, feed gas comprising methane and carbon dioxide, or methane, carbon dioxide, and steam may be reformed to produce synthesis gas.

Synthesis gas may be introduced at high temperature into a catalytic centrifuge or a second rotor comprising catalyst effective for Fischer-Tropsch conversion of synthesis gas into hydrocarbons. In this manner, higher hydrocarbons may be produced via the disclosed system and method. The disclosed system and process may enhance the performance and/or alter the product distributions of Fischer-Tropsch processes by enhancing contact time of catalyst and synthesis gas.

Alternatively or additionally, synthesis gas may be passed through a catalytic centrifuge or a rotor of a catalytic centrifuge of this disclosure having catalytic functionality for the production of mixed alcohols from synthesis gas. In such applications, the disclosed system and method may be used to improve the selectivity and rate of reaction for the production of mixed alcohols from synthesis gas.

Example 3

Feed gas comprising steam, methane, and carbon dioxide may be used to produce alcohols, aldehydes or other desired product. The presence of water above the boiling point (i.e., steam) may serve to provide oxygen and hydrogen to this and other reactions.

Example 4

In embodiments, a catalytic rotor of a catalytic centrifuge comprises hydrogenation catalyst. In this manner, the disclosed system and method may be used to hydrogenate, for example, acetylene to ethylene, or hydrogenate propadiene to other olefins and/or paraffins. Acetylenes and dienes are undesired products produced in the cracking of ethane, propane and higher molecular weight hydrocarbons. Aromatics are also produced in high temperature cracking of naphthalene. Some of these aromatics may be hydrogenated or oxidized to carbon oxides via the disclosed system and method.

Example 5

World-wide, acetic acid is produced from methanol by carbonylation, i.e. methanol plus carbon dioxide using a ruthenium-based catalyst. (When cobalt is used, the pressures are on the order of 6000 psi, but for the ruthenium catalyst the pressure decreases to 1500 psi.) In embodiments, the system and process of the present disclosure are used to produce acetic acid via reaction of methanol and carbon dioxide.

Example 6

Ethanol production by the reaction of methanol with carbon dioxide and hydrogen may also benefit from the use of the presently-disclosed system and process.

Example 7

Reaction of methane with olefins, dienes, or aromatics to produce higher molecular weight products.

Example 8

Reaction of carbon dioxide with water (steam) to produce sugars.

Example 9

Reaction of alcohols, aldehydes and or ketones to produce olefins and or higher molecular weight hydrocarbons typical of synthetic fuels such as jet fuel, kerosene, gasoline and or diesel fuel. More specific examples are methanol converted to low molecular weight olefins such as ethylene and propylene by using the catalyst, SAPO-34. The use of H-ZSM-5 and the appropriate temperatures, gasoline and diesel fuel may be produced from methanol.

Example 10

Partial oxidation of methane may be conducted and depending on the catalyst and reaction conditions various products may be produced. Predominately ethylene might be produced by the reaction referred to in the patent and open literature as oxidative coupling of methane. At yet a different set of conditions and catalyst methanol may be produce.

Example 11

Partial oxidation of ethane to produce ethylene and/or acetic acid by use of the appropriate catalyst and set of reaction temperature, pressure, and residence time.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

We claim:

1. An apparatus comprising:
    a first porous rotor positioned about an axis of rotation, wherein the first porous rotor comprises a first catalyst;
    a second porous rotor concentric with the first porous rotor, wherein the second porous rotor comprises a second catalyst;
    an outer casing, wherein the outer casing and the first porous rotor are separated by an annular space; and
    a motor configured for rotating the first porous rotor about the axis of rotation.

2. The apparatus of claim 1, the apparatus further comprising:
    a feed inlet line; and
    a first outlet line, wherein the first outlet line is in fluid communication with the annular space.

3. The apparatus of claim 2, wherein the feed inlet line is fluidly connected with the interior space, and wherein the first porous rotor is positioned surrounding an interior space.

4. The apparatus of claim 3, wherein the first porous rotor comprises a selectively permeable material.

5. The apparatus of claim 4, wherein the selectively-permeable material is made with, impregnated with, or coated with an additional catalyst.

6. The apparatus of claim 5, wherein the selectively-permeable material comprises sintered metal or ceramic.

7. The apparatus of claim 3, wherein the feed inlet line extends into the interior space.

8. The apparatus of claim 7, wherein the feed inlet line extends into a vertically central portion of the interior space.

9. The apparatus of claim 1, the apparatus further comprising a feed inlet line fluidly connected with the interior space, and wherein the second porous rotor is positioned surrounding a second interior space.

10. The apparatus of claim 9, the apparatus further comprising an outlet line, wherein the outlet line is fluidly connected with the second interior space.

11. The apparatus of claim 1, wherein the first catalyst and the second catalyst are the same.

12. The apparatus of claim 1, wherein the first catalyst and the second catalyst are different.

13. A system comprising a plurality of the apparatus of claim 1.

14. A method of producing a product of a gaseous reaction, the method comprising:
    contacting a feed gas comprising at least one gaseous reactant with a rotor wherein the rotor is permeable to the at least one gaseous reactant, and wherein the rotor comprises a catalyst effective for catalyzing the gaseous reaction;
    extracting the product from an outlet side of the rotor; and
    passing the product through a second rotor from an inlet side, wherein the second rotor is permeable to the product, and wherein the second rotor is made from or contains additional catalyst effective for catalyzing a second reaction.

15. The method of claim 14, the method further comprises rotating the rotor about an axis of rotation at a rotational frequency.

16. The method of claim 15, wherein the rotor is cylindrical and porous.

17. The method of claim 16, wherein the rotor comprises sintered metal or ceramic.

18. The method of claim 17, wherein the sintered metal or ceramic is made with, impregnated with, or coated with catalyst.

* * * * *